Figure 1:
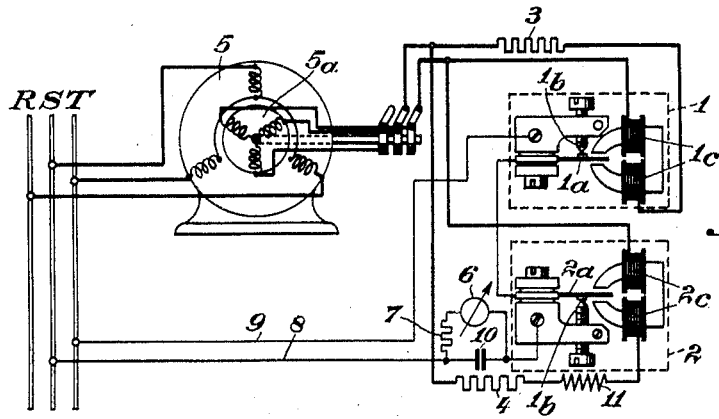

Nov. 29, 1932.    G. KEINATH ET AL    1,889,553

ARRANGEMENT FOR OBTAINING INSTANTANEOUS VALUES

Filed March 16, 1932

Inventors
Georg Keinath
Hans Pfannenmüller
by Lorra v. Kellenbeck
Attorneys.

Patented Nov. 29, 1932

1,889,553

UNITED STATES PATENT OFFICE

GEORG KEINATH, OF BERLIN-CHARLOTTENBURG, AND HANS PFANNENMÜLLER, OF BERLIN-SIEMENSSTADT, GERMANY, ASSIGNORS TO SIEMENS & HALSKE AKTIEN-GESELLSCHAFT, OF BERLIN-SIEMENSSTADT, GERMANY, A CORPORATION OF GERMANY

ARRANGEMENT FOR OBTAINING INSTANTANEOUS VALUES

Application filed March 16, 1932, Serial No. 599,200, and in Germany March 21, 1931.

The invention relates to an arrangement for obtaining instantaneous values of definite phase position from periodically varying voltages or currents, for instance for the purpose of plotting the shape of curve point by point. The well-known Joubert contact disc driven by a synchronous motor or the like has hitherto been generally used for this purpose. This arrangement has certain disadvantages insofar as disturbances easily arise due to the friction of the contacts on the disc, especially when measuring small voltages or currents. Furthermore, the great mass of the motor and the disc is inconvenient at rapid variations of frequency.

One object of the invention is to provide an arrangement capable of being used for the same purpose as the above-mentioned known arrangement, but which avoids the disadvantages of the latter. This object is attained by using for the derivation of the instantaneous values two series-connected synchronous switches which change over every half-period and the change-over of which takes place with a mutual phase displacement which is less than 180°, owing to a corresponding choice of the mutual phase position of the exciting currents.

A further object of the invention is to reduce substantially the time necessary for plotting the curves. According to this feature of the invention the instantaneous values of the current or the voltage to be tested and derived through the two synchronously operating switches are rendered operative on the measuring mechanism of a recording instrument.

In conjunction therewith means are provided which bring about a positive movement between the mutual displacement of the recording means and the recording surface in the direction of the diagram abscissa on the one hand, and the adjustment of the phase shifter on the other hand.

Figure 2:
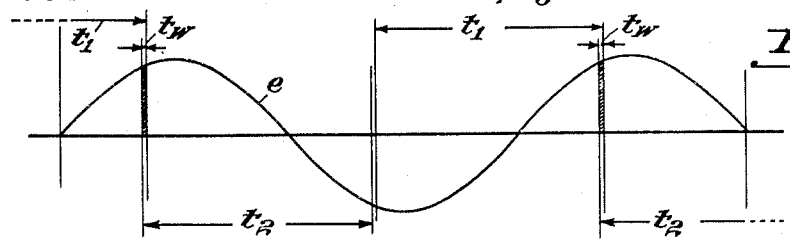
Figure 3:
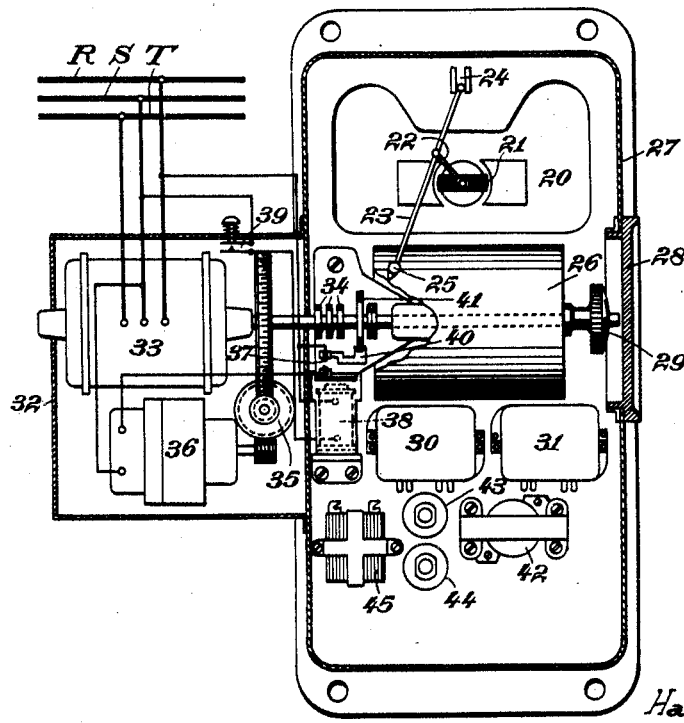

In the drawing affixed to the specification and forming part thereof shows:

Fig. 1, an embodiment of the invention employed for the determination of the voltage curve of an electric three-phase system, Fig. 2, an explanatory diagram, and Fig. 3, a further embodiment of the invention.

Although the invention may be employed for various purposes, a definite application has been illustrated in Fig. 1, in order to facilitate the understanding. In the case shown by way of example it is assumed that in an electric three-phase alternating current system, the phases of which are designated by R, S and T, it is desired to determine the shape of the voltage curve between the two phases S and T by means of the improved arrangement. This arrangement comprises essentially two synchronously operating switches 1 and 2, which, as also assumed in Fig. 1, may be constructed in the same way as the mechanical one-way vibrating reed rectifiers.

The reeds 1a and 2a respectively of each synchronous switch consisting of steel and provided with a contact has counter contacts 1b and 2b respectively assigned to it. According to the polarity of the current supplied to the exciting windings or coils 1c and 2c respectively the reeds 1a and 2a respectively are moved against the counter contact or are pulled away from it. On energizing one of the rectifiers with alternating current the respective contact is opened during the positive or negative half wave of the exciting alternating current and kept closed during the oppositely directed half wave of the exciting alternating current. The supply of current to the contact of each synchronous switch takes place on the one hand through the carrying members for the counter contacts 1b and 2b respectively, and on the other hand through the reeds 1a and 2a respectively insulated against said carrying member. The exciting windings 1c and 2c of the synchronous switches 1 and 2 are through a series resistances 3 and 4 respectively each connected to the terminals of the secondary coil of a phase shifter 5 of known construction, the primary of which is connected to the three-phase system RST in the manner shown. Preferably the phase shifter has an adjusting range of 360 electrical degrees. By correspondingly turning the rotor 5a of the phase shifter 5, the currents flowing through the exciting windings 1c and 2c of the synchronous switches 1 and 2 may then be brought into any desired phase relationship to the voltage obtaining at the system RST.

The switch contacts of the two synchronous switches 1 and 2 are connected in series with a galvanometer 6 and a series resistance 7, through the lines 8 and 9 to the voltage obtaining between the phases S and T and to be tested. A condenser 10 is connected in shunt with the galvanometer 6 and the ohmic resistance 7.

As shown in the drawing the two synchronous switches are with their exciting coils connected to the terminals of the secondaries of the phase shifter 5 with such polarity, that when the currents flowing through the exciting windings 1c and 2c are in phase, one of the synchronous switches always opens its contact when the other synchronous switch closes its corresponding contact. Therefore in this case, in which the change-over of the two synchronous switches 1 and 2 takes place with a mutual phase displacement of 180°, the circuit through the contacts of the two synchronous switches and the galvanometer 6 is always open, that is dead. If, however, the phase displacement prevailing between the change-over of the synchronous switch 1 and that of the synchronous switch 2 is made slightly less than 180°, for which purpose an inductance 11 may be connected in series with the exciting winding 2c, for instance, as shown in Fig. 1 of the drawing, the result is that the duration of the contact closure of the synchronous switch 1 partly overlaps as regards time that of the contact closure of the synchronous switch 2 and therefore the circuit under consideration through the galvanometer 6, and the switching contact of the two synchronous switches is closed for a short period, during which an instantaneous value or a small range of instantaneous values of definite phase position of the alternating voltage between the lines S and T becomes operative. The conditions prevailing will now be more fully described with reference to Fig. 2 of the drawing. The curve e represents the course of the alternating voltage obtaining between the phases R and T.

With $t_1$ are designated the periodically recurring periods of time during which the contact of the synchronous switch 1 is closed for half a cycle at a time. $t_2$ represents the corresponding periods of time during which the contact of the synchronous switch 2 is closed. If now, as assumed in the diagram, the change-over of the synchronous switch 2 is displaced by less than 180° in relation to that of the synchronous switch 1, the periods of time during which the two synchronous switches are closed overlap by the amount designated $t_w$ in the drawing. In this way a narrow strip is, so to say, cut out of the voltage curve, which strip is proportional to the mean value of the respective strip of the voltage curve, i. e. made operative on the measuring instrument. If the setting of the phase shifter 5 and the other conditions of the arrangement remain unchanged, the same section is cut out of the alternating voltage tapped between the phases S and T during every cycle, so that periodically a direct current voltage is fed to the galvanometer, the value of which is determined by the mean value of the voltage section cut out. The deflection of the galvanometer 6 is therefore a measure for the mean value. The connection in circuit of the condenser 10 has merely the object to steady the indications of the galvanometer 6 in spite of periodic voltage surges. The smaller the range $t_w$ the more accurately corresponds the value indicated by the galvanometer 6 to a definite instantaneous value of the voltage. The magnitude of this range can easily be adjusted by alternating the inductance 11 connected in series with the exciting coil of the synchronous switch, for which purpose a variable inductance, a second phase shifter or the like is preferably employed.

It is obvious from the above explanation that by altering the phase position of the exciting currents of the synchronous switches 1 and 2 in relation to voltage connected to the measuring circuit proper, it is possible to adjust at will the phase position of the section cut out of the voltage curve within the voltage curve, so that the arrangement may be employed for plotting or tracing the voltage curve point by point as well as, for instance, for the continuous measurement of the peak voltage or any other definite instantaneous value.

If the shape of the curve or the peak voltage of a periodically varying current is to be determined, this may be effected by means of the new arrangement by connecting the circuit passing through the galvanometer 6 and the switching contacts of the synchronous switches to the terminals of a resistance, for instance, traversed by the current to be examined.

The improved arrangement is by no means limited to the application for measuring purposes, but may equally well be employed in regulating devices which serve for limiting or setting the peak value of a voltage, for instance.

Instead of employing as synchronous switches devices which correspond with mechanical rectifiers, as shown in Fig. 1, it is also possible to use such valve rectifier circuits, for instance dry rectifier circuits, which also act as synchronous switches and which have already been proposed for other purposes. Since circuits of this nature are already described in the pending application Ser. No. 527,030, filed April 1, 1931, it appears unnecessary to enter here into a detailed description.

The improved arrangement is not only suitable for replacing an expensive oscillograph employed in many cases for determining the curve shape of a periodically varying voltage or a periodically varying current, but may owing to its high sensitivity be employed then also when the available voltages or currents to be measured are so small, that an oscillograph would no longer be able to record them directly.

The length of time necessary for recording curve shapes is considerably reduced, if, according to a further feature of the invention, the instantaneous values derived through the two synchronous switches are rendered operative on a measuring movement of a recording instrument and means are provided which produce a positive relationship between the mutual displacement of the stylus and the recording surface in the direction of the diagram abscissa and the adjustment of the phase shifter. In this way it is easily possible to trace continuous graphs just as by means of the oscillograph. This modification of the apparatus becomes particularly simple if the ordinary recording instrument with movable recording surface is employed and its driving mechanism is mechanically coupled to the rotor of the phase shifter, for instance, by mounting the drum for carrying the record strip or sheet directly upon the shaft of the rotor of the phase shifter.

An example of such a construction is illustrated in Fig. 3, partly in section. The measuring movement 20 of the recording instrument may be of the movable coil type, as shown in the drawing.

In order to convert the angular deflections of the moving coil 21 into a linear displacement of a stylus, a straight-line link motion in the form of a so-called elliptical guide motion is provided, the auxiliary link 22 of which is at one of its ends connected to the measuring motion axis, and whose recording lever 23 is at one of its ends guided in a straight guide 24, in the ordinary manner and carries at its other end the stylus 25, adapted to sweep over the recording drum. When the moving coil 21 performs an angular motion the stylus 25 moves along the recording drum 26 parallel to the axis of the latter. The drum 26 together with the remaining parts of the equipment is enclosed by a housing 27 and may after removal of the cover 28 and loosening attachment nut 29 be lifted out of said housing. Underneath said recording drum 26 there are arranged the two synchronous switches 30 and 31 enclosed in protective casings. A special box 32 laterally mounted on the housing 27 accommodates a phase shifter 33, whose shaft carries the slip rings 34 for collecting the exciting currents adjustable as regards the phase for the synchronous switches 30 and 31 and also the shaft extension serving for the reception of the recording drum 26. The rotor of the phase shifter 33 and the recording drum 26 are together coupled with an electric motor 36 through a double worm gear 35. It will be understood, however, that a spring movement might replace the electric motor.

In view of the inertia of the measuring motion 20 the ratio of transmission between the driving motor 36 and the phase shifter 33 and the recording drum 26 is so chosen that a complete revolution of the phase shifter rotor and the recording drum 26 takes about one minute.

The feeding of the phase shifter stator and the electric motor 36 takes place from the three-phase system RST. In the circuit of the electric motor 36 is connected the working contact 37 of a relay 36 in whose energizing circuit likewise fed from the system RST there is connected a push-button switch 39. When switching in the electric motor 36 the push-button switch 39 is operated whereby the relay 38 is energized for the duration of the operation of the push-button switch 39. It consequently closes its contact 37 and simultaneously pulls the tooth or detent 40 connected with the movable contact piece of this contact out of a notch or recess of the disc 41 connected to the shaft of the phase shifter. The periphery of the disc 41 is only interrupted by this said single notch. The disc is otherwise circular and of such a diameter that apart from the point where the notch is located it holds the movable contact piece through the tooth 40 in contact with the counter contact. As the motor 36 starts when the relay contact 37 is closed and the disc coupled with it consequently also starts revolving, the circuit of the motor first remains closed even after the push-button switch 39 has been released, i. e. after the energizing circuit of the relay 39 has been broken, for the duration of a complete revolution of the disc 41, i. e. until the tooth or detent 40 drops again into the notch of the disc 41 and the relay contact 37 is thus automatically broken.

The electric connections of the measuring circuit proper, omitted in Fig. 3 for the sake of clearness, are preferably the same as in the arrangement illustrated in Fig. 1, in which case the measuring movement 20 and its moving coil 21 respectively are connected in series with the switching contacts of the two synchronous switches 30 and 31 to a voltage corresponding to the value to be measured, while the exciting windings of the two synchronous switches 30 and 31 are fed from the rotor winding of the phase shifter through the slip rings, and its stator winding is connected to a voltage having the same frequency as the voltage to be measured. In Fig. 3 of the drawing the stator winding is connected to the system RST under the assumption that the shape of the curve of the voltage or the current should be determined in the system RST, as in the case illustrated in Fig. 1. Referring to this figure, 42 is a choke coil, 43 and 44 ohmic resistances in the form of coils, and 45 a condenser. These parts correspond to the choke coil 11, the ohmic resistances 3 and 4 and the condenser 10 in the representation according to Fig. 1 and are connected in the measuring circuit in the same manner as shown there.

It is obvious that for taking a curve it is merely necessary to cover the drum 26 with a recording chart and after switching in the voltage to be measured and the voltage feeding the phase shifter to operate the push-button switch 39.

In cases in which with regard to the measuring accuracy or for other reasons it is impossible to tap a sufficient current from the voltage to be measured proper, amplifier arrangements may, of course, be connected in series to the measuring movement 20.

In like manner a very sensitive measuring instrument may be directly connected in series to the two synchronous switches and a follow-up device may in known manner be controlled by this instrument, which device in its turn drives the writing link 23. Such arrangements using, for instance, a bolometer are well-known per se and do not call for further description.

The positively guided motion between the mutual displacement of the writing means and the recording surface in the direction of the diagram abscissa, on the one hand, and the adjustment of the phase shifter, on the other hand, may also be brought about by different means from those shown in Fig. 3, for instance, by making use of a beam of light controlled by the measuring movement as recording medium, in the path of the rays of which deflecting means are movably arranged, such as a prism, and coupled with the rotor of the phase shifter, so that in accordance with the adjustment of the phase shifter the light recorder is displaced in the direction of the diagram abscissa on the sensitized recording surface, which remains stationary during the exposure.

From the last described embodiment, it will be readily understood that the term recording means in the meaning of the specification and claims is by no means limited to a stylus or the like, but is intended to cover also a beam of light in conjunction with a sensitized recording layer.

It will also be understood that the invention is not confined to the constructional details shown, which must be considered as examples only and may be modified in many ways, and that the scope of the invention and the ambit of the appended claims extends to any construction incorporating the broad principle underlying the invention.

We claim as our invention:

1. In an arrangement of the kind described, an electric circuit adapted to be connected to a periodically varying alternating voltage, two synchronous switches connected in series in said circuit, and means adapted to effect the displacement of the connected phase of the one synchronous switch in relation to that of the other synchronous switch.

2. In an arrangement of the kind described, an electric circuit adapted to be connected to a periodically varying alternating voltage, two synchronous switches connected in series in said circuit, each of said synchronous switches containing a member adapted to be oscillated, a contact mounted on said member, a stationary counter-contact, an electromagnet for driving said oscillating member, and means adapted to effect the displacement of the connected phase of the one synchronous switch in relation to that of the other synchronous switch.

3. In an arrangement of the kind described, an electric circuit adapted to be connected to a periodically varying alternating voltage, two synchronous switches connected in series in said circuit, adjustable means for adjusting the connected phases of both synchronous switches in relation to the phase of the periodically varying voltage which feeds the circuit passed through the contacts of the two synchronous switches, and means adapted to effect the displacement of the connected phase of the one synchronous switch in relation to that of the other synchronous switch.

4. In an arrangement of the kind described, an electric circuit adapted to be connected to a periodically varying alternating voltage, two synchronous switches connected in series in said circuit, the exciting circuits of said synchronous switches connected to adjustable means, said means on being connected to a source of alternating current adapted to feed said exciting circuits of said synchronous switches with alternating currents which in their phase displacement depend upon the adjustment of said means, and means connected in the exciting circuit of one synchronous switch adapted to effect a displacement of the connected phase of one synchronous switch in relation to that of the other synchronous switch.

5. In an arrangement of the kind described, an electric circuit adapted to be connected to a periodically varying alternating voltage, two synchronous switches connected in series in said circuit, each of said synchronous switches containing a member adapted to be oscillated, a contact mounted on said member, a stationary counter-contact, an electromagnet for driving said oscillating member, the electromagnets of said synchronous switches connected to adjustable means, said means on being connected to a source of alternating current adapted to feed the electromagnets of said synchronous switches with alternating currents which in their phase displacement depend on the adjustment of said means, and connected in the exciting circuit of one synchronous switch means adapted to effect the displacement of the connected phase of the one synchronous switch in relation to that of the other synchronous switch.

6. In an arrangement of the kind described, an electric circuit adapted to be connected to a periodically varying alternating voltage, two synchronous switches and a measuring instrument connected in series in said circuit, and means adapted to effect the displacement of the connected phase of the one synchronous switch in relation to that of the other synchronous switch.

7. In an arrangement of the kind described, an electric circuit adapted to be connected to a periodically varying alternating voltage, two synchronous switches and a measuring instrument connected in series in said circuit, adjustable means for adjusting the connected phases of both said synchronous switches in relation to the phase of the periodically variable voltage which feeds the circuit passed through the contacts of the two synchronous switches, and means adapted to effect the displacement of the connected phase of the one synchronous switch in relation to that of the other synchronous switch.

8. In an arrangement of the kind described, an electric circuit adapted to be connected to a periodically varying voltage, a measuring instrument and two synchronous switches connected in series in said circuit, each of said synchronous switches containing a member adapted to oscillate, a contact mounted on said member, a stationary counter contact, an electromagnet for operating said oscillating member, the electromagnets of said two synchronous switches connected to adjustable means on being connected to a source of alternating current adapted to feed the electromagnets of said synchronous switches with alternating currents which in their phase displacement depend on the adjustment of the said means, and means connected in the exciting circuit of the one synchronous switch adapted to effect the displacement of the connected phase of one synchronous switch in relation to that of the other synchronous switch.

9. In an arrangement of the kind described, an electric circuit adapted to be connected to a periodically varying alternating voltage, two synchronous switches and a measuring mechanism connected in series in said circuit, adjustable means for adjusting the connected phases of both synchronous switches in relation to the phase of the periodically varying voltage which feeds the circuit taken across the contacts of the two synchronous switches, means for recording the deflections of the measuring mechanism on a recording surface, and further means adapted to bring about a positive relationship between the adjustment of the said means for the positive adjustment of the connected phases of both synchronous switches, on the one hand, and the relative displacement of the recording means taking place in the direction of the diagram abscissa and the recording surface, on the other hand.

10. In an arrangement of the kind described, an electric circuit adapted to be connected to a periodically varying alternating voltage, two synchronous switches and a measuring mechanism connected in series in said circuit, a phase shifter comprising a stator and a rotor for feeding the exciting circuits of the two synchronous switches, a recording surface, means for recording the deflections of the measuring mechanism on said recording surface, a feeding device for moving said recording surface in the direction of the diagram abscissa, and coupling means for the mechanical coupling of the phase shifter rotor with the feeding device for the recording surface.

11. In an arrangement of the kind described, an electric circuit adapted to be connected to a periodically varying alternating voltage, two synchronous switches and a measuring mechanism connected in series in said circuit, a phase shifter comprising a stator and a rotor for feeding the exciting circuits of the two synchronous switches, in the exciting circuit of the one synchronous switch means adapted to effect a displacement of the connected phase of the one synchronous switch in relation to that of the other synchronous switch, a recording surface, means for recording the deflections of the measuring mechanism on said recording surface, a feeding device for advancing the recording surface in the direction of the diagram abscissa, and coupling means for the mechanical coupling of the phase shifter rotor with the feeding device for the recording surface.

12. In an arrangement of the kind described, an electric circuit adapted to be connected to a periodically varying alternating voltage, two synchronous switches and a measuring mechanism connected in series in said circuit, a phase shifter comprising a stator and a rotor for feeding the exciting circuits of the two synchronous switches, a drum for carrying a recording surface, means for tracing the deflections of the measuring mechanism on the recording surface applied to the drum, parallel to the axis of the drum, and coupling means for mechanically coupling said drum with the shaft of the phase shifter motor.

13. In an arrangement of the kind described, an electric circuit adapted to be connected to a periodically varying alternating voltage, two synchronous switches and a measuring mechanism connected in series in said circuit, a phase shifter comprising a stator and a rotor for feeding the exciting circuits of the two synchronous switches, a recording surface, means for recording the deflections of the measuring mechanism on said recording surface, a feeding device for moving said recording surface in the direction of the diagram abscissa, and a drive common to the rotor of the phase shifter and the propelling device of the recording surface.

14. In an arrangement of the kind described, an electric circuit adapted to be connected to a periodically varying alternating voltage, two synchronous switches and a measuring mechanism connected in series in said circuit, a phase shifter comprising a stator and a rotor for feeding the exciting circuits of the two synchronous switches, a drum for carrying a recording surface, means for tracing the deflections of the measuring mechanism on the recording surface applied to the drum, parallel to the axis of the drum, said drum connected with the driving shaft of the phase shifter rotor, and a drive for the phase shifter rotor.

15. In an arrangement of the kind described, an electric circuit adapted to be connected to a periodically varying alternating voltage, two synchronous switches and a measuring mechanism connected in series in said circuit, a phase shifter comprising a stator and a rotor for feeding the exciting circuits of the two synchronous switches, a recording surface, a propelling device for moving said recording surface in the direction of the diagram abscissa, means for tracing the deflections of the measuring mechanism on said recording surface, a drive common for the phase shifter rotor and the propelling device of the recording surface, and means for the automatic limitation of the rotation of the phase shifter rotor and the movement of the record propelling device coupled with it to a definite amount.

16. In an arrangement of the kind described, an electric circuit adapted to be connected to a periodically varying alternating voltage, two synchronous switches and a measuring mechanism connected in series in said circuit, a phase shifter comprising a stator and a rotor for feeding the exciting circuits of the two synchronous switches, a recording surface, a recording lever carrying a stylus and contacting by said stylus with the recording surface, coupling means located between said recording lever and said measuring mechanism, and means adapted to move said recording surface transversely to the path of the stylus, said means coupled with the phase shifter rotor.

17. In an arrangement of the kind described, an electric circuit adapted to be connected to a periodically varying voltage, a measuring arrangement and two synchronous switches connected in series in said circuit, each of said synchronous switches containing a member capable of performing oscillations, a contact on said member, a stationary counter contact and an electromagnet for driving said oscillating member, a phase shifter comprising a stator and a rotor, for energizing the electromagnets of said two synchronous switches, a recording surface, a recording link adapted for holding a stylus and with said stylus inserted to make contact by it with said recording surface, coupling means located between said recording link and the movable member of the measuring mechanism of said measuring arrangement, and means adapted to displace said recording surface transversely to the path described by the stylus, said means coupled with the phase shifter rotor.

In testimony whereof we affix our signatures.

GEORG KEINATH.
HANS PFANNENMÜLLER.